(12) United States Patent
Fukano et al.

(10) Patent No.: US 6,889,706 B2
(45) Date of Patent: May 10, 2005

(54) FLOW RATE CONTROL APPARATUS

(75) Inventors: Yoshihiro Fukano, Moriya (JP);
Tadashi Uchino, Moriya (JP);
Takamitsu Suzuki, Mitsukaido (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/305,189

(22) Filed: Nov. 27, 2002

(65) Prior Publication Data

US 2003/0102032 A1 Jun. 5, 2003

(30) Foreign Application Priority Data

| Dec. 4, 2001 | (JP) | ........................................ 2001-370480 |
| Jun. 14, 2002 | (JP) | ........................................ 2002-174209 |

(51) Int. Cl.$^7$ .......................... F16K 47/00; G05D 7/06; G05D 16/20
(52) U.S. Cl. .................... 137/487.5; 137/495; 137/554; 137/613
(58) Field of Search .............................. 137/487.5, 494, 137/495, 553, 554, 556, 613; 700/282

(56) References Cited

U.S. PATENT DOCUMENTS

| 4,299,251 A | * | 11/1981 | Dugas ........................ 137/556 |
| 4,635,901 A | * | 1/1987 | Pond .......................... 251/355 |
| 4,694,390 A | * | 9/1987 | Lee ............................. 700/45 |
| 5,047,965 A | * | 9/1991 | Zlokovitz ................... 700/282 |
| 5,329,966 A | | 7/1994 | Fenimore et al. |
| 5,460,196 A | * | 10/1995 | Yonnet ......................... 137/12 |
| 5,549,137 A | | 8/1996 | Lenz et al. |
| 5,564,677 A | * | 10/1996 | Levy et al. ............. 251/129.12 |
| 5,758,967 A | | 6/1998 | King |
| 6,568,416 B2 | * | 5/2003 | Tucker et al. .................. 137/14 |

FOREIGN PATENT DOCUMENTS

| EP | 0 926 355 | 6/1999 |
| FR | 763 215 | 4/1934 |
| JP | 40-16934 | 8/1965 |
| JP | 62-824112 | 4/1987 |
| JP | 06-295209 | 10/1994 |
| JP | 10-328321 | 8/1998 |

OTHER PUBLICATIONS

NOTE: English language abstracts of the above Japanese citations are provided to serve as partial translations thereof.

* cited by examiner

Primary Examiner—Ramesh Krishnamurthy
(74) Attorney, Agent, or Firm—Paul A. Guss

(57) ABSTRACT

A flow rate control apparatus is constructed by integrally assembling a pulsation-attenuating mechanism for balancing a regulated pilot pressure from a pressure-regulating section and a primary pressure of a pressure fluid flowing through a fluid passage to attenuate pressure fluctuation caused by pulsation of the pressure fluid, and a flow rate control mechanism for controlling a flow amount of the pressure fluid flowing through the fluid passage by adjusting a valve lift amount of a valve plug with a linear actuator controlled based on a rotary driving control signal from a controller.

8 Claims, 10 Drawing Sheets

FLOW RATE CONTROL APPARATUS

BACKGROUND OF THE INVENTION

1. Field of the Invention

The present invention relates to a flow rate control apparatus which attenuates the pulsation of a pressure fluid flowing through a fluid passage and which is capable of controlling the flow rate of the pressure fluid highly accurately.

2. Description of the Related Art

FIG. 10 shows a conventional flow rate control system for controlling the flow rate of a fluid flowing through a fluid passage.

The flow rate control system 1 comprises a pump 3 which pumps and feeds a pressure fluid stored in a tank 2, an opening/closing valve 5 which is connected on the downstream side of the pump 3 via a tube passage 4 and which opens/closes a fluid passage for the pressure fluid fed from the pump 3, and a flow rate control valve 7 which is connected on the downstream side of the opening/closing valve 5 via a tube passage 6 and which controls the flow rate of the pressure fluid flowing through the fluid passage.

A flow rate sensor 8, which detects the flow rate of the pressure fluid flowing through the fluid passage, is provided on the downstream side of the flow rate control valve 7. The flow rate of the pressure fluid flowing through the fluid passage is indicated on an indicator 9 based on a detection signal supplied from the flow rate sensor 8.

An electropneumatic regulator 11 is connected to the flow rate control valve 7 via a tube passage 12 for regulating the pressure of the air supplied from a compressed air supply source 10 to provide a predetermined pilot pressure for a pilot chamber of the flow rate control valve 7. The electropneumatic regulator 11 controls the air supplied from the compressed air supply source 10 to have a predetermined pressure based on a control signal from a controller 13 so that the pressure is provided as a pilot pressure.

The operation of the conventional flow rate control system 1 described above will be schematically explained. The pressure fluid is stored in the tank 2 and is fed by the pump 3. The pressure fluid is introduced into the flow rate control valve 7 when the opening/closing valve 5 is opened. The pilot pressure is regulated to have the predetermined pressure by the electropneumatic regulator 11, and is introduced into the pilot chamber of the flow rate control valve 7. The valve opening degree of an unillustrated valve plug is controlled in the flow rate control valve 7 by balancing the pilot pressure introduced into the pilot chamber and the pressure (primary pressure) of the pressure fluid supplied from the opening/closing valve 5.

Therefore, the valve opening degree of the valve plug is adjusted in the flow rate control valve 7 by balancing the pilot pressure controlled based on the control signal from the controller 13 and the primary pressure of the pressure fluid supplied from the opening/closing valve 5. The pressure fluid is provided after being controlled to have the flow rate corresponding to the valve opening degree of the valve plug.

The flow rate of the pressure fluid from the flow rate control valve 7 is detected by the flow rate sensor 8, and the detected flow rate is indicated on the indicator 9.

However, in the conventional flow rate control system 1 described above, the valve opening degree of the flow rate control valve 7 is controlled by the pneumatic pressure (pilot pressure) from the electropneumatic regulator 11. Therefore, some dispersion appears in the flow rate due to the delay of response when the valve opening degree of the unillustrated valve plug is controlled, and it is difficult to stably control the flow rate.

Further, in the conventional flow rate control system 1, the piping passages between the fluid-operated apparatuses including, for example, the opening/closing valve 5, the flow rate control valve 7, and the electropneumatic regulator 11 are connected by the tube passages 4, 6. Therefore, piping operation is complicated, installation area is increased, and working space is increased.

Furthermore, in the conventional flow rate control system 1, some pressure fluctuation such as pulsation appears in the pressure fluid supplied from the opening/closing valve 5, for example, resulting from the feeding operation of the pump. Therefore, it is difficult to stably control the flow rate by the flow rate control valve 7.

SUMMARY OF THE INVENTION

A general object of the present invention is to provide a flow rate control apparatus which makes it possible to eliminate any delay of response when the valve opening degree of a valve plug is controlled, downsize the entire apparatus, and reduce the installation space.

A principal object of the present invention is to provide a flow rate control apparatus which makes it possible to attenuate pressure fluctuation such as pulsation and stably control the flow rate of a pressure fluid.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
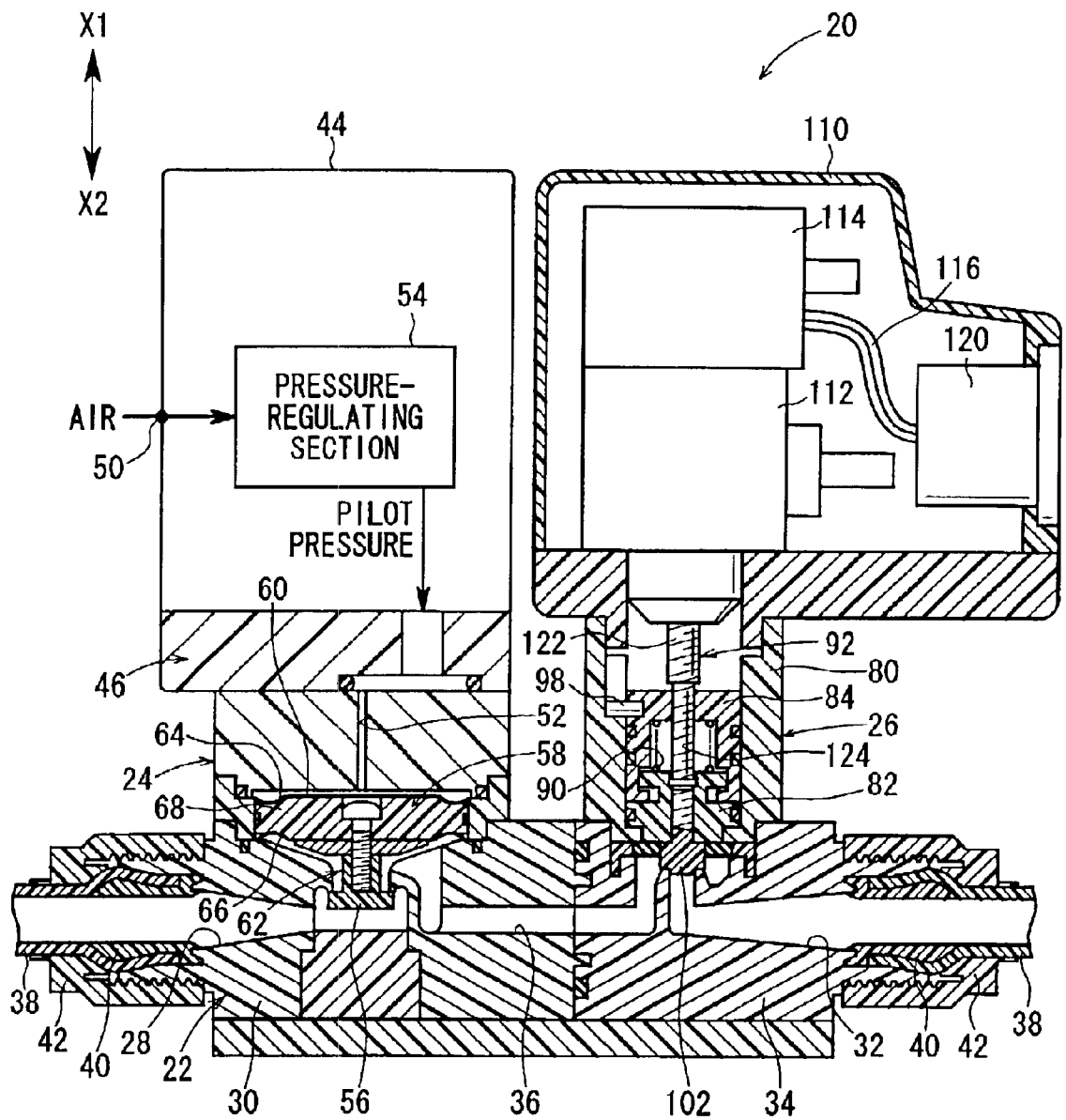
FIG. 1 is, with partial omission, a vertical sectional view illustrating a flow rate control apparatus according to an embodiment of the present invention.

In FIG. 1, reference numeral 20 indicates a flow rate control apparatus according to an embodiment of the present invention.

The flow rate control apparatus 20 comprises a joint section 22 to which unillustrated tubes are detachably connected while being spaced from each other by a predetermined distance, a pulsation-attenuating mechanism 24 which is provided on one side in the axial direction of the joint section 22, and a flow rate control mechanism 26 which is provided on the other side in the axial direction of the joint section 22.

The flow rate control apparatus 20 is constructed by integrally assembling the joint section 22, the pulsation-attenuating mechanism 24, and the flow rate control mechanism 26.

The joint section 22 has a first joint body 30 which is provided with a first port 28 at one end, and a second joint body 34 which is provided with a second port 32 at the other end. A fluid passage 36 is provided in the first and second joint bodies 30, 34 connected substantially coaxially by a seal member for communicating with the first port 28 and the second port 32.

Further, the joint section 22 includes inner members 40 and lock nuts 42. The inner members 40 are engaged with the first port 28 and the second port 32 respectively and are inserted into openings of the tubes 38. The lock nuts 42 are screwed into screw grooves engraved at the ends of the first and second joint bodies 30, 34 to retain the liquid-tightness at the connecting portions of the tubes 38 thereby.

The pulsation-attenuating mechanism 24 is arranged on the joint section 22 disposed closely to the first port 28. The pulsation-attenuating mechanism 24 has a housing 46 which is constructed by connecting a plurality of block members including a bonnet 44 disposed at an upper position.

The air is supplied into the bonnet 44 via a pressure fluid supply port 50 connected to a compressed air supply source 48. A pressure-regulating section 54 is provided in the bonnet 44 for regulating the pressure of the air supplied from the pressure fluid supply port 50 to have a predetermined pressure and flowing the pressure-regulated air to a passage 52.

In the pressure-regulating section 54, the air from the pressure fluid supply port 50 is supplied to a diaphragm chamber (not shown). The spring force of a spring member adjusted by an unillustrated pressure-regulating handle is balanced with the pressing force to press a diaphragm (not shown) by the pressure of the pressure fluid introduced into the diaphragm chamber. A stem and a valve plug, which are not shown, are displaced under the bending action of the unillustrated diaphragm. Accordingly, the pressure of the air supplied from the pressure fluid supply port 50 can be regulated to have a desired pressure.

On the other hand, a pulsation-balancing section 58 is provided under the housing 46 to operate a valve plug 56 for opening/closing the fluid passage 36 (ON/OFF operation) based on the air from the pressure-regulating section 54.

Figure 2:
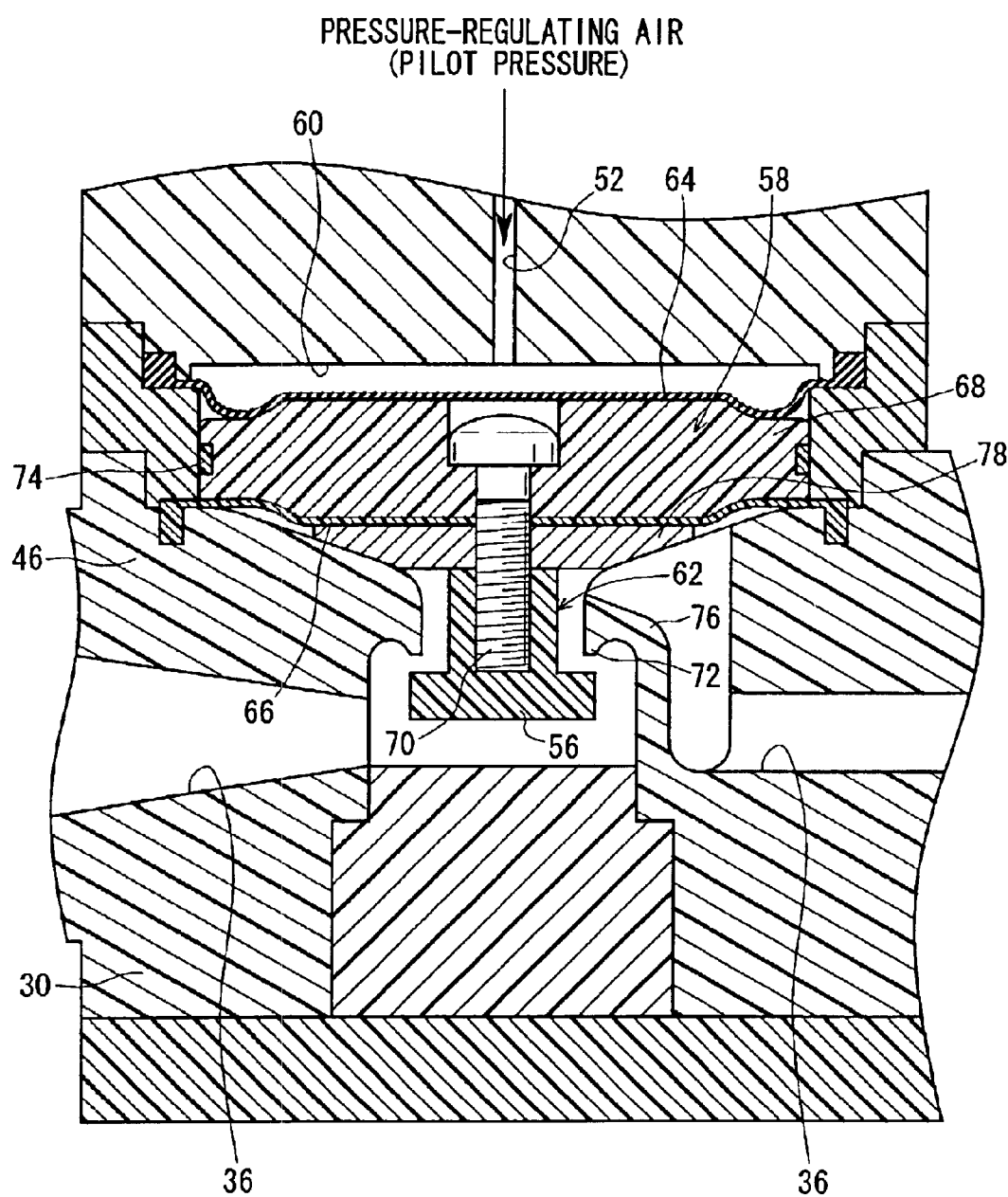
FIG. 2 is a partial magnified vertical sectional view illustrating a pulsation-balancing section of the flow rate control apparatus shown in FIG. 1.

As shown in FIG. 2, the pulsation-balancing section 58 is provided with a pressure chamber 60 into which the air (pilot pressure) from the pressure-regulating section 54 via the passage 52 is introduced. A valve member 62 facing the fluid passage 36 is displaced by the air introduced into the pressure chamber 60.

The valve member 62 has a sliding plate 68 which is arranged between an upper first diaphragm 64 and a lower second diaphragm 66 and which is displaceable in the vertical direction, a valve plug 56 which is connected to a lower central portion of the sliding plate 68 by a screw member 70 and which approaches or separates from a seat section 72 formed on the housing 46, a seal member 74 which is attached to an annular groove on the outer circumferential surface of the sliding plate 68, and an intermediate member 78 which is interposed between the sliding plate 68 and the valve plug 56 and which functions as a stopper by contacting an inclined surface 76 formed on the housing 46.

The first diaphragm 64 is formed of, for example, a rubber material, and functions to protect the sliding plate 68. The second diaphragm 66 is preferably formed of, for example, a resin material such as polytetrafluoroethylene (PTFE) to retain the liquid-tightness for the pressure fluid and exclude any liquid pool.

Even if the pressure fluid flowing through the fluid passage 36 undergoes the pressure fluctuation such as pulsation, the pressure fluctuation of the pressure fluid flowing through the fluid passage 36 can be attenuated by the pressure of the air supplied to the pressure chamber 60, and it is possible to flow the pressure fluid having a substantially constant pressure.

The flow rate control mechanism 26 has a housing 80 which is connected to the second joint body 34, and a first piston 82 and a second piston 84 which are displaceable in the direction of the arrow X1 or X2 along a chamber formed in the housing 80.

Figure 3:
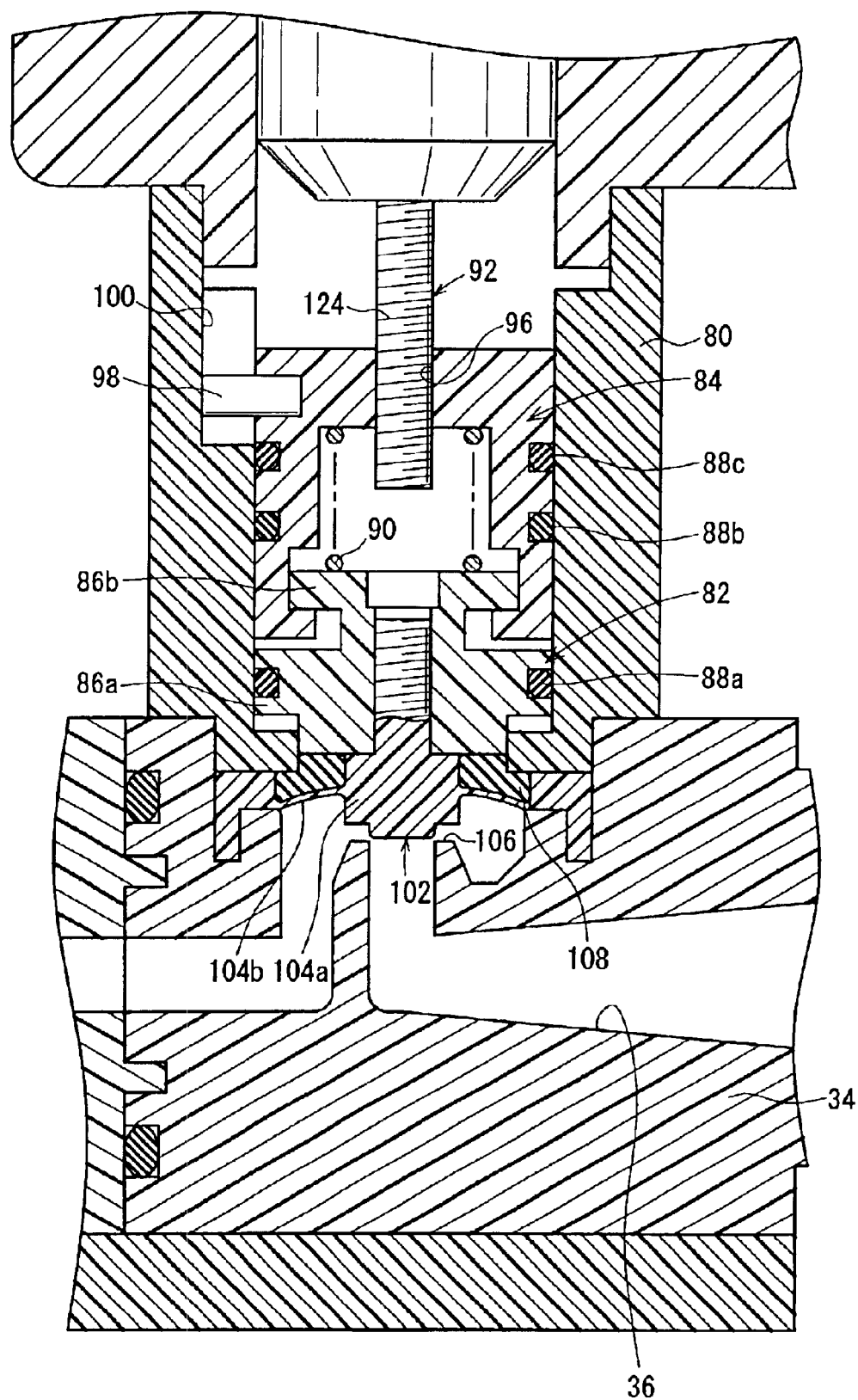
FIG. 3 is a partial magnified vertical sectional view illustrating a flow rate control mechanism of the flow rate control apparatus shown in FIG. 1.

As shown in FIG. 3, the first piston 82 is provided with a lower first protrusion 86a having a large diameter and an upper second protrusion 86b having a small diameter. The lower first protrusion 86a is slidably inserted into the housing 80. A piston packing 88a is attached to an annular groove on the outer circumferential surface of the first piston 82.

The second protrusion 86b of the first piston 82 is engaged with a recess formed at a lower portion of the second piston 84. A pair of piston packings 88b, 88c are attached to annular grooves on the outer circumferential surface of the second piston 84. The second piston 84 is slidably inserted into the housing 80.

A spring member 90 is interposed between the inside of the second piston 84 and the second protrusion 86b. The first piston 82 and the second piston 84 are urged away from each other by the spring force of the spring member 90.

A penetrating screw hole 96 is formed at a substantially central portion of the second piston 84, and is screwed with a drive shaft 92 as described later on.

A pin member 98 is attached to a groove on the side surface of the second piston 84 so that the pin member 98 protrudes by a predetermined length. The pin member 98 is engaged with an engaging groove 100 formed on the side surface of the housing 80. The pin member 98 prevents the second piston 84 from rotating in the circumferential direction when the second piston 84 is displaced in the axial direction.

A valve plug 102 made of, for example, a flexible material such as a resin material or a rubber material is connected to the lower end of the first piston 82. The valve plug 102 is displaced together with the first piston 82. The valve plug 102 comprises a thick-walled section 104a formed at a substantially central portion, and a thin-walled section 104b which is formed integrally with the thick-walled section 104a. The valve plug 102 is formed to be flexibly bendable.

The valve plug 102 opens/closes the fluid passage 36 by separating from a seat section 106 formed on the second joint body 34 or by seating on the seat section 106. Further, the valve plug 102 highly accurately controls the flow rate of the pressure fluid flowing through the fluid passage 36 based on the valve lift amount of the valve plug 102 (displacement amount of the valve plug 102 in the axial direction).

A ring-shaped buffer member 108 is provided on the upper surface of the valve plug 102 for protecting the thin-walled section 104b of the valve plug 102. The buffer member 108 is made of, for example, an elastic member such as rubber, and retained by the lower surface of the housing 80.

As shown in FIG. 1, a bonnet 110 is provided on the upper side of the flow rate control mechanism 26 and is assembled to an upper portion of the housing 80. A linear actuator 112 and a rotation-detecting section 114 are provided in the bonnet 110. The linear actuator 112 drives the valve plug 102 by energizing an unillustrated power source. The rotation-detecting section 114 detects the displacement amount of the valve plug 102 based on the displacement amount of the linear actuator 112.

A connector 120 is arranged closely to the rotation-detecting section 114, and is used to send a detection signal to a controller 118 via a lead wire 116.

The linear actuator 112 comprises a linear stepping motor which is energized/deenergized in accordance with a rotary driving control signal (pulse signal) from the controller 118. The linear actuator 112 includes an unillustrated stator and an unillustrated rotor provided in a casing. The unillustrated rotor is rotated in a predetermined direction under the action of a magnetically exciting current supplied from the unillustrated power source.

The drive shaft 92 of the linear actuator 112 is provided displaceably in the axial direction (direction of the arrow X1 or X2) under the rotary action thereof.

The drive shaft 92 of the linear actuator 112 is provided with a first shaft section 122 and a second shaft section 124 which are engraved with screw portions having predetermined pitches, respectively. The diameter of the upper first shaft section 122 is larger than the diameter of the lower second shaft section 124.

An unillustrated light-emitting section and an unillustrated light-receiving section are disposed at mutually opposing positions while being spaced from each other by a predetermined distance in the rotation-detecting section 114. An unillustrated rotor is provided in the rotation-detecting section 114, and is connected to the drive shaft 92 of the linear actuator 112 to rotate together with the drive shaft 92. In this arrangement, the emitted light from the light-emitting element passes through the inside of the rotor, and is received by the light-receiving element. Accordingly, for example, the angle of rotation and the number of rotation of the drive shaft 92 of the linear actuator 112 are detected and are sent as detection signals to the controller 118.

The controller 118 calculates the displacement amount of the drive shaft 92 in the axial direction based on the detection signal such as the number of rotation and the pitch data of the drive shaft 92 of the linear actuator 112. The distance between the valve plug 102 and the seat section 106, i.e., the valve lift amount of the valve plug 102 is calculated based on the result of the calculation performed by the controller 118.

Therefore, the controller 118 determines the deviation from the preset lift amount of the valve plug 102 to adjust the lift amount of the valve plug 102 so that the deviation should be zero. Accordingly, it is possible to highly accurately control the flow rate of the pressure fluid flowing through the fluid passage 36.

The flow rate control apparatus 20 according to the embodiment of the present invention is basically constructed as described above. Next, its operation, function, and effect will be explained.

Figure 4:
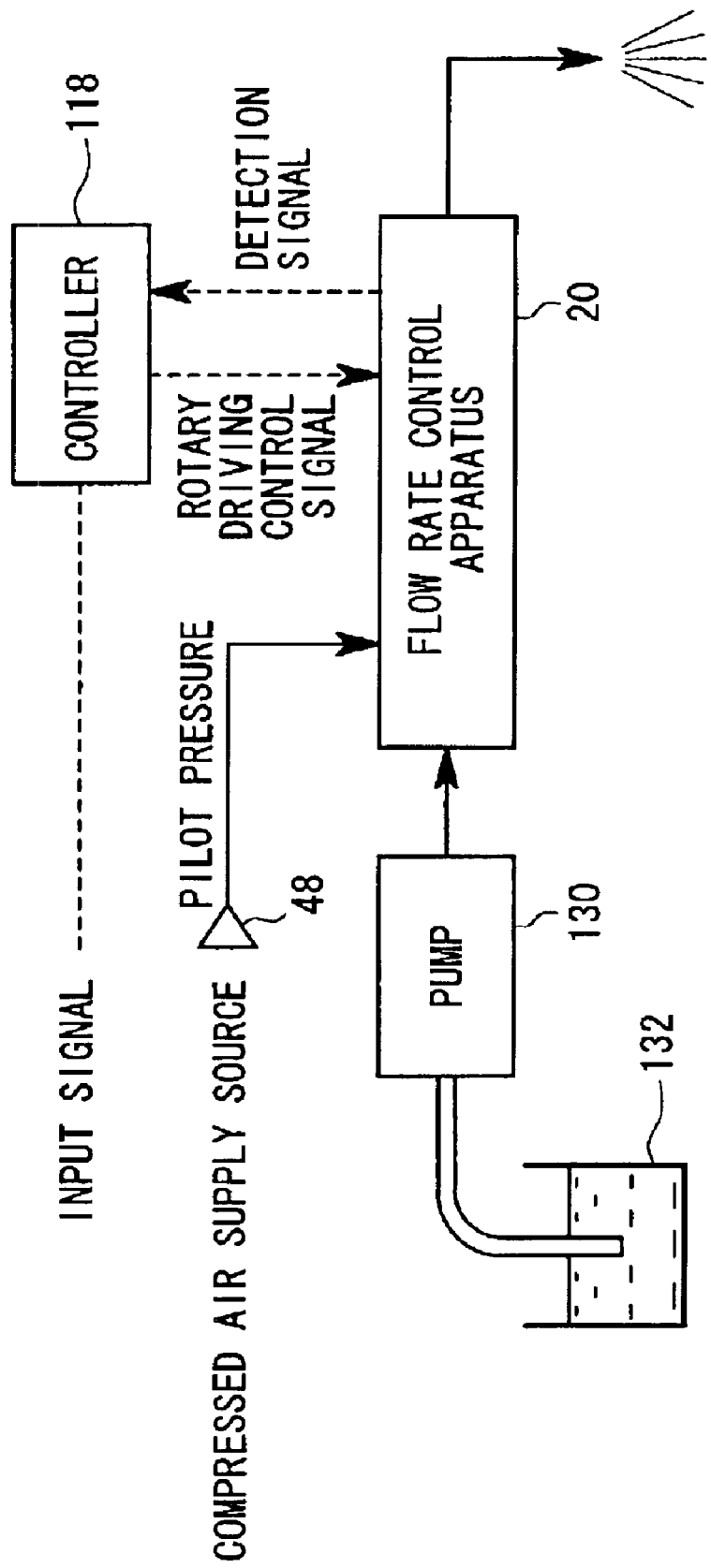
FIG. 4 shows a block diagram illustrating an arrangement of a flow rate control system into which the flow rate control apparatus shown in FIG. 1 is incorporated.

As shown in FIG. 4, the pressure fluid stored in the tank 132 is fed to the joint section 22 of the flow rate control apparatus 20 by pumping with the pump 130. The pressure fluid is introduced into the pulsation-balancing section 58 via the first port 28 of the joint section 22. In the pressure-regulating section 54, the air supplied from the pressure fluid supply port 50 is introduced into the unillustrated diaphragm chamber. The spring force of the spring member is balanced with the pressure of the air introduced into the diaphragm chamber under the bending action of the unillustrated diaphragm. Accordingly, the air is regulated to have a desired pressure.

Therefore, the air regulated to have the desired pressure by the pressure-regulating section 54 is introduced into the pressure chamber 60 of the pulsation-balancing section 58 via the passage 52. The primary pressure of the pressure fluid flowing through the fluid passage 36 is balanced with the pressure of the air introduced into the pressure chamber 60.

If the pressure fluid flowing through the fluid passage 36 undergoes any pressure fluctuation such as pulsation, the pressure fluctuation of the pressure fluid flowing through the fluid passage 36 is attenuated by the air supplied to the pressure chamber 60, and the pressure of the pressure fluid flowing through the fluid passage 36 can be maintained to be substantially constant.

In other words, if the pressure fluid flowing through the fluid passage 36 undergoes any pressure fluctuation such as pulsation, the pressure fluctuation of the pressure fluid is transmitted via the second diaphragm 66 to the sliding plate 68, and the sliding plate 68 is slightly moved up and down. During this process, buffering action is effected by the air in the pressure chamber 60 which is provided on the side opposite to the fluid passage 36 with the sliding plate 68 interposing therebetween. Accordingly, the pressure fluctuation of the pressure fluid is attenuated, and is absorbed suitably.

The pressure fluid from the pulsation-balancing section 58 flows along the fluid passage 36 and is introduced into the flow rate control mechanism 26. In the flow rate control mechanism 26, the lift amount of the valve plug 102 for adjusting the distance between the valve plug 102 and the seat section 106 is established by energizing/deenergizing the linear actuator 112 based on the rotary driving control signal from the controller 118. The valve opening degree of the valve plug 102 is adjusted. The pressure fluid flowing through the fluid passage 36 is controlled to have a flow rate corresponding to the valve opening degree of the valve plug 102.

The controller 118 sends an energizing signal to the linear actuator 112 to displace the first and second shaft sections 122, 124 as the drive shaft 92 of the linear actuator 112 in the direction of the arrow X1. Therefore, the first piston 82 and the second piston 84 screwed with the second shaft section 124 in the penetrating screw hole 96 are displaced upwardly by the rotation of the drive shaft 92. Accordingly, the valve plug 102 is also moved upwardly, and the valve plug 102 is separated from the seat section 106.

The displacement amount of the valve plug 102 in the axial direction is detected by the rotation-detecting section 114 as the amount of rotation of the linear actuator 112. The controller 118 controls the linear actuator 112 so that the valve plug 102 is stopped at a preset position based on the detection signal (pulse signal) from the rotation-detecting section 114.

The controller 118 counts the pulse signals from the rotation-detecting section 114 and sends a deenergizing signal to the linear actuator 112 when a preset predetermined number of pulses are counted, so that the driving of the linear actuator 112 is stopped. The controller 118 can calculate the displacement amount of the drive shaft 92 from the amount of rotation such as the number of rotation and the angle of rotation of the drive shaft 92 and the screw pitch of the second shaft section 124 screwed with the second piston 84. As a result, the lift amount of the valve plug 102 can be controlled highly accurately, and the flow rate of the pressure fluid corresponding to the lift amount of the valve plug 102 can be controlled highly accurately.

As described above, in the embodiment of the present invention, the lift amount of the valve plug 102 is controlled based on the rotary driving control signal from the controller 118. Therefore, the valve opening degree of the valve plug 102 can be regulated without any dispersion in response unlike the conventional art, and it is possible to stably control the flow rate of the pressure fluid flowing through the fluid passage 36.

In the embodiment of the present invention, the apparatus is constructed, for example, as if the opening/closing valve 5, the flow rate control valve 7, and the electropneumatic regulator 11, which relate to the conventional art, are integrally assembled. Therefore, it is unnecessary to perform any piping operation for connecting the respective fluid-operated apparatuses. There is no liquid leakage or the like from the piping materials. The entire apparatus can be downsized, and it is possible to reduce installation space.

Figure 5:
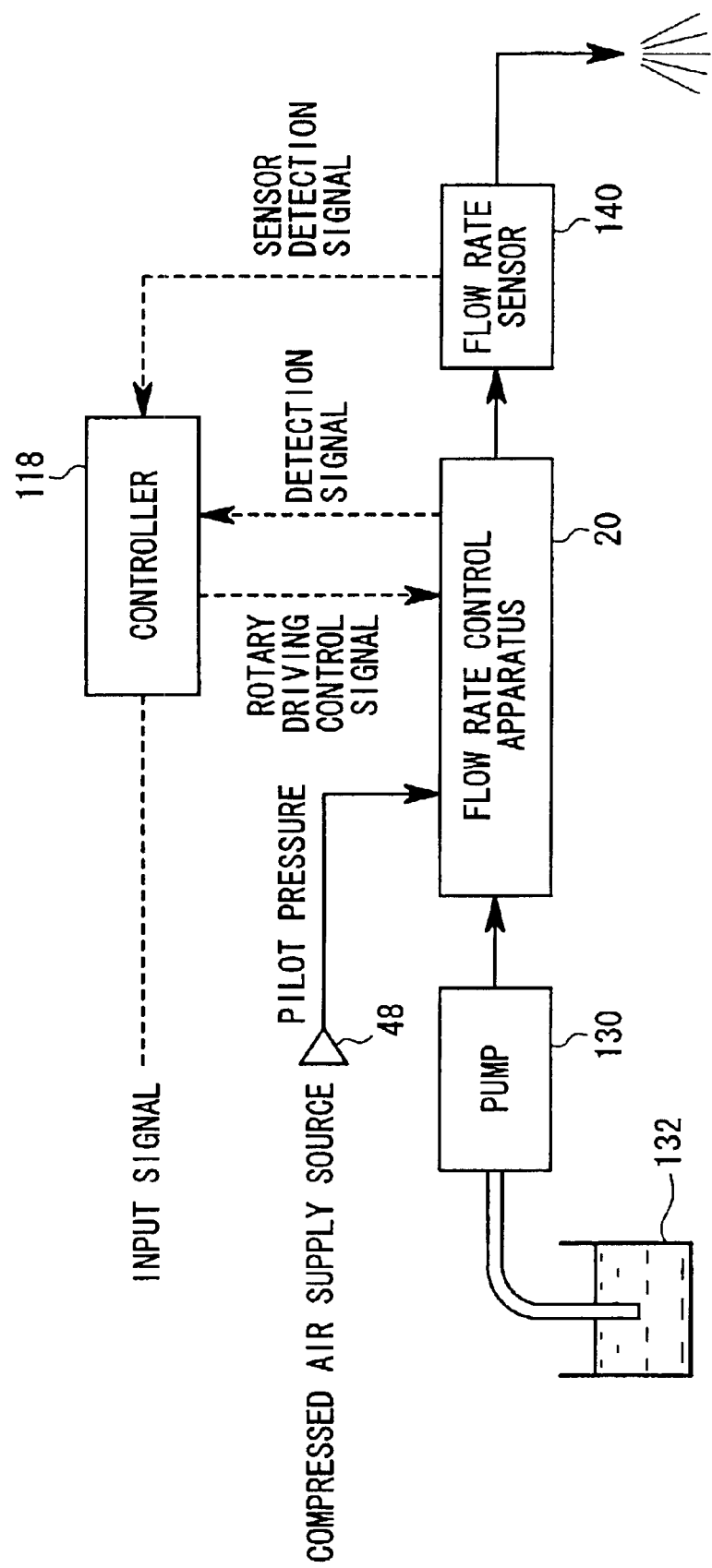
FIG. 5 shows a block diagram illustrating an arrangement of an exemplary modified embodiment of the flow rate control system shown in FIG. 4.
Figure 6:
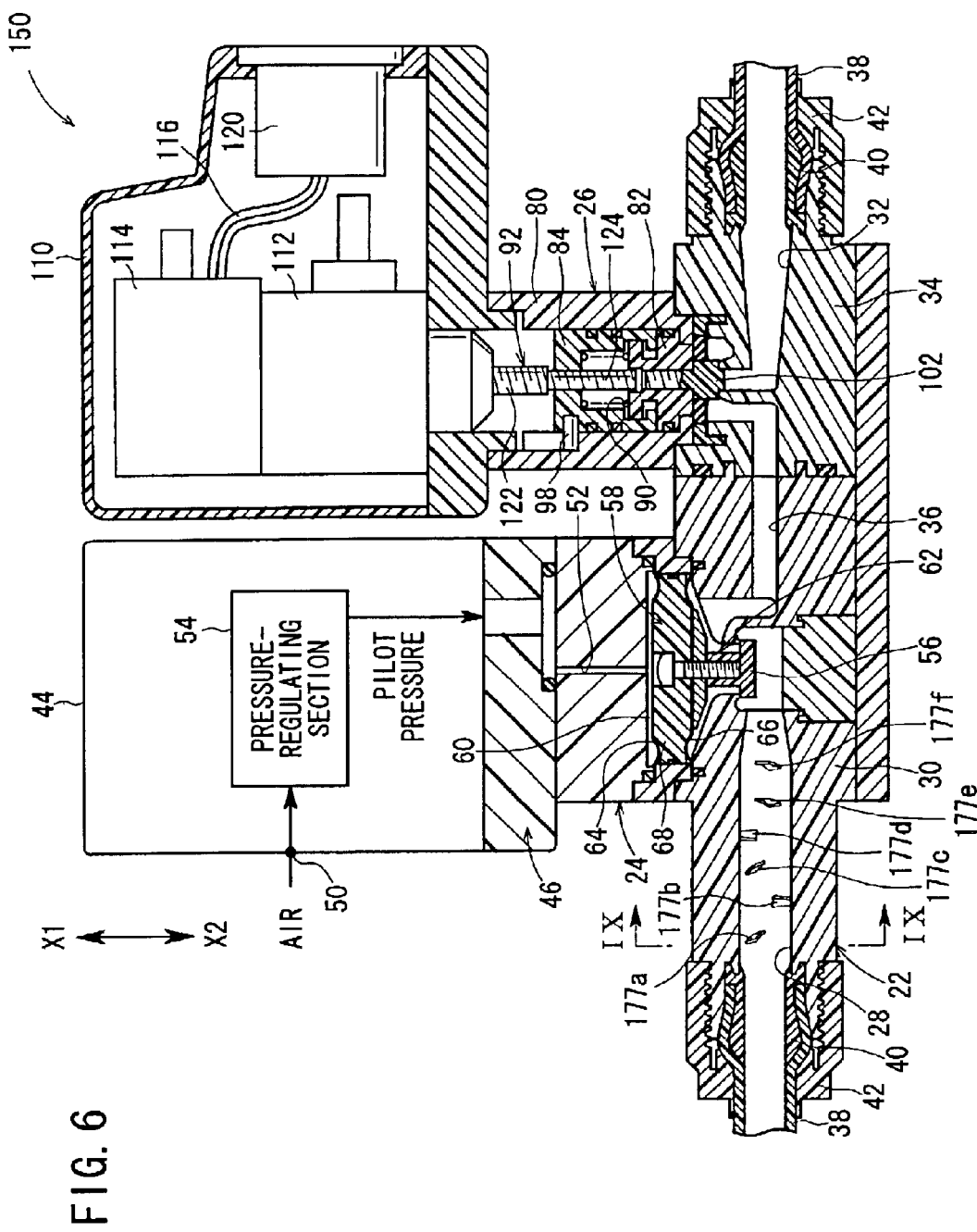
FIG. 6 is, with partial omission, a vertical sectional view illustrating a flow rate control apparatus according to another embodiment of the present invention.
Figure 7:
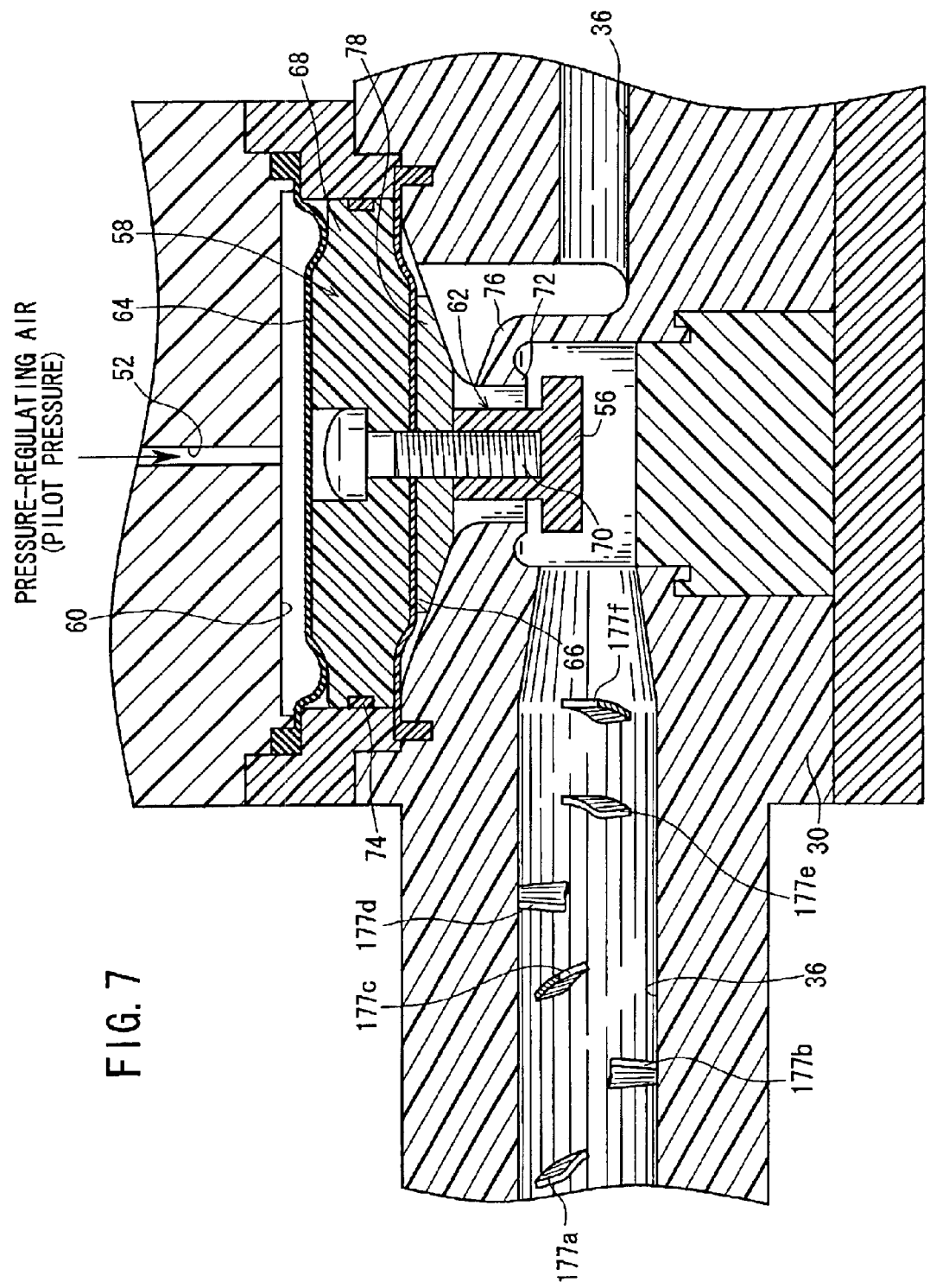
FIG. 7 is a partial magnified vertical sectional view illustrating a pulsation-balancing section of the flow rate control apparatus shown in FIG. 6.

Further, as shown in FIG. 5, a flow rate sensor 140 is arranged in the fluid passage on the downstream side of the flow rate control apparatus 20 to perform the feedback control by sending a sensor detection signal from the flow rate sensor 140 into the controller 118. Therefore, it is possible to monitor the flow rate of the fluid flowing through the fluid passage 36 in real time.

In this arrangement, the controller 118 compares the preset flow rate data with the sensor detection signal from the flow rate sensor 140 to adjust the valve lift amount of the valve plug 102 so that the difference therebetween should be zero. Accordingly, it is possible to highly accurately control the flow rate of the fluid actually flowing through the fluid passage 36.

Next, a flow rate control apparatus 150 according to another embodiment of the present invention is shown in FIGS. 6 to 9. The constituent components that are the same as those of the flow rate control apparatus 20 according to the embodiment described above shown in FIG. 1 are designated by the same reference numerals, detailed explanation of which will be omitted.

The flow rate control apparatus 150 according to the another embodiment comprises a plurality of wave-dissipating projections (projections) 177a to 177f which are provided on the inner wall of the fluid passage 36 disposed closely to the first port 28 and which protrude by predetermined lengths from the inner wall surface toward the internal center of the fluid passage 36.

Figure 8:
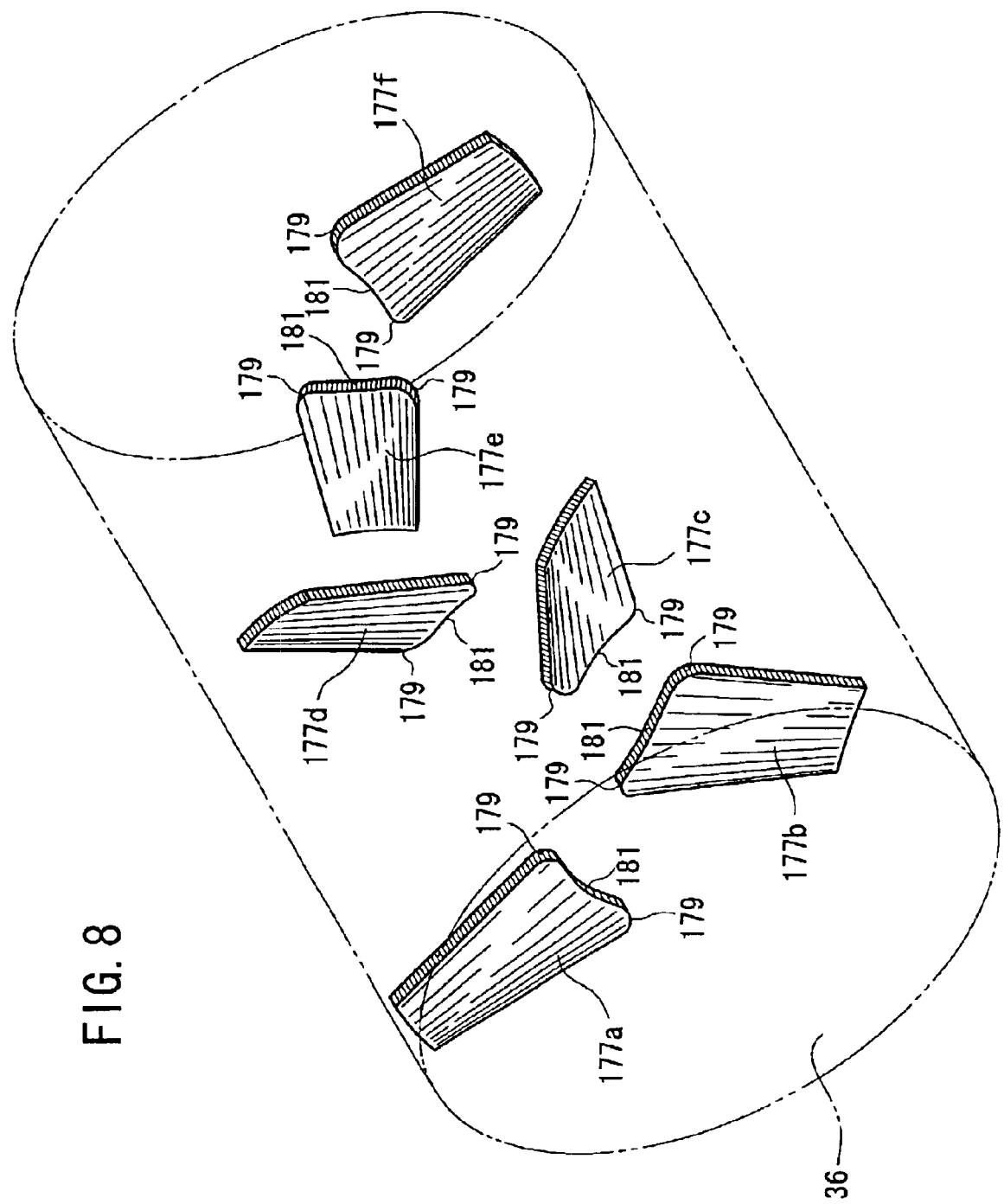
FIG. 8 is a see-through perspective view illustrating a plurality of wave-dissipating projections provided on an inner wall in a fluid passage of the flow rate control apparatus shown in FIG. 6.
Figure 9:
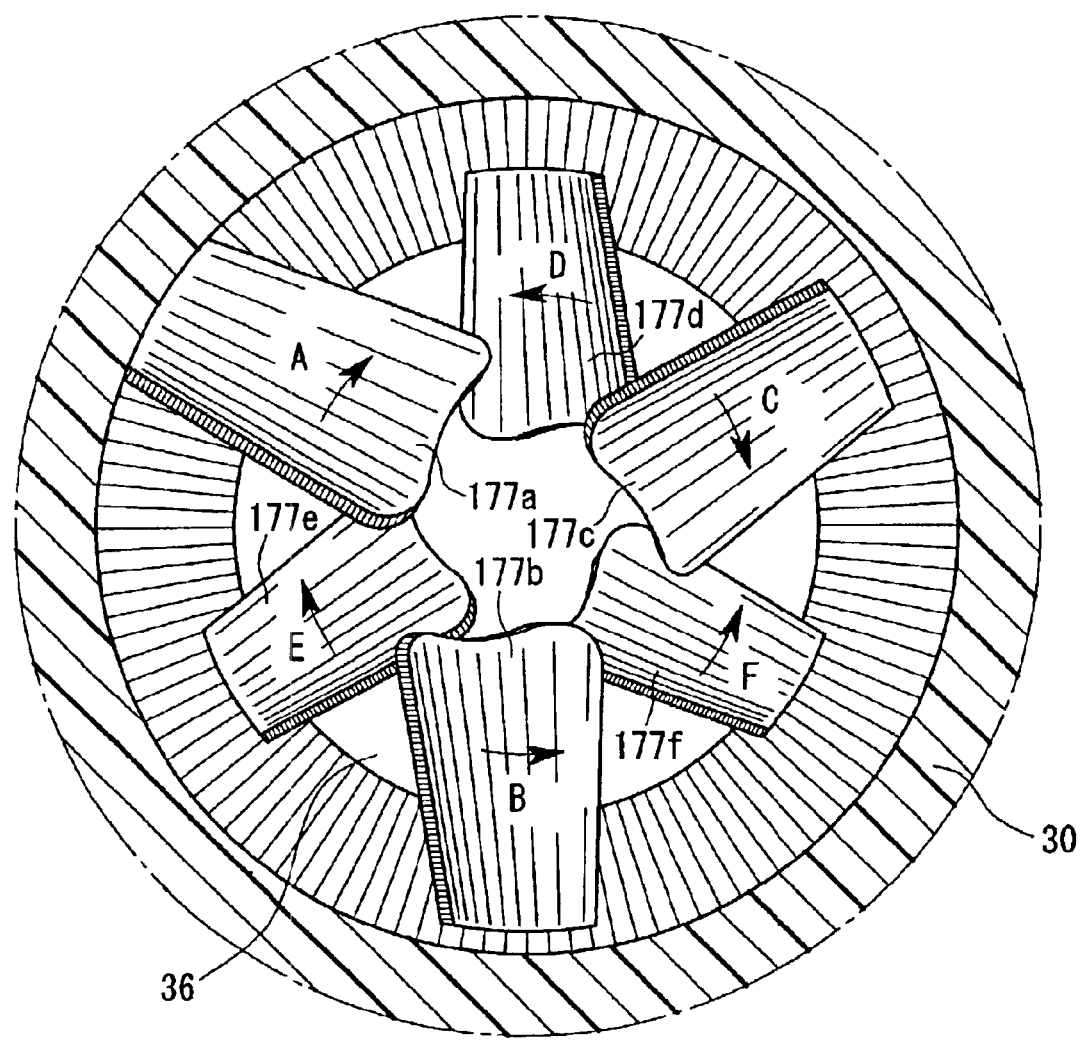
FIG. 9 is a vertical sectional view taken along a line IX—IX shown in FIG. 6.
Figure 10:
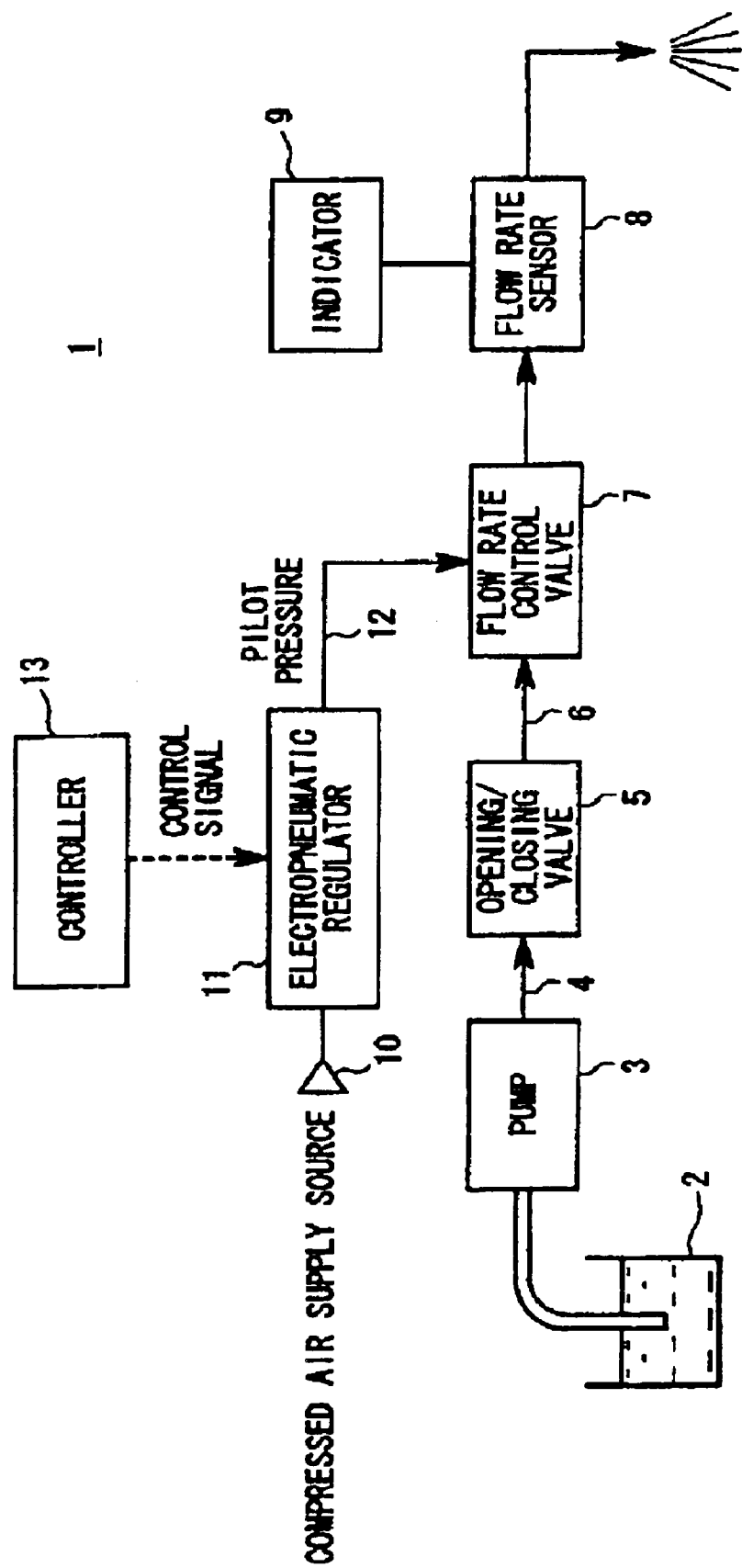
FIG. 10 shows a block diagram illustrating an arrangement of a conventional flow rate control system.

As shown in FIGS. 8 and 9, the plurality of wave-dissipating projections 177a to 177f have substantially trapezoidal shapes with their widths being gradually widened from the inner wall of the fluid passage 36 toward the center of the fluid passage 36. Each of the plurality of wave-dissipating projections 177a to 177f has a curved section 179 with a chamfered end and a slightly depressed recess 181. The plurality of wave-dissipating projections 177a to 177f are arranged while being spaced from each other by predetermined distances helically in the clockwise direction on the inner circumferential wall surface of the fluid passage 36.

In this arrangement, as shown in FIG. 9, the first wave-dissipating projection 177a disposed most closely to the first port 28 is inclined by a predetermined angle in the direction of the arrow A, the second wave-dissipating projection 177b is inclined by a predetermined angle in the direction of the arrow B, the third wave-dissipating projection 177c is inclined by a predetermined angle in the direction of the arrow C, the fourth wave-dissipating projection 177d is inclined by a predetermined angle in the direction of the arrow D, the fifth wave-dissipating projection 177e is inclined by a predetermined angle in the direction of the arrow E, and the sixth wave-dissipating projection 177f is inclined by a predetermined angle in the direction of the arrow F. The number of the plurality of wave-dissipating projections 177a to 177f is not limited to six. A desired number of the wave-dissipating projections may be set corresponding, for example, to the bore diameter and the flow passage length of the fluid passage 36.

If any pulsation appears in the pressure fluid flowing through the fluid passage 36, the pulsating pressure fluid collides with the plurality of wave-dissipating projections 177a to 177f. The pulsation energy included in the pressure fluid can be dispersed and dissipated by the plurality of wave-dissipating projections 177a to 177f.

Therefore, even if the pressure fluid flowing through the fluid passage 36 undergoes the pressure fluctuation such as pulsation, the pressure fluid collides with the plurality of wave-dissipating projections 177a to 177f protruding on the inner wall of the fluid passage 36, and the pulsation energy is attenuated. Further, the pulsation energy of the pressure fluid flowing through the fluid passage 36 is attenuated by the pressure of the air supplied to the pressure chamber 60. Thus, the pressure fluid flows while being kept at a substantially constant pressure.

In the other embodiment, if the pressure fluctuation such as pulsation appears in the pressure fluid flowing through the fluid passage 36, the pulsating pressure fluid collides with the inclined surfaces of the plurality of wave-dissipating projections 177a to 177f respectively. The pulsation energy included in the pressure fluid is dispersed by the plurality of wave-dissipating projections 177a to 177f. Accordingly, the pulsation energy can be smoothly dissipated.

As described above, in the other embodiment, even if the pressure fluid flowing through the fluid passage 36 undergoes the pressure fluctuation such as pulsation, the pressure fluid collides with the plurality of wave-dissipating projections 177a to 177f protruding on the inner wall of the fluid passage 36, and the pulsation energy is attenuated. Further, the pulsation energy of the pressure fluid flowing through the fluid passage 36 is attenuated by the pressure of the air supplied to the pressure chamber 60. Thus, the pressure fluid flows while being kept at a substantially constant pressure.

As a result, in the other embodiment, the pressure fluctuation such as pulsation of the pressure fluid can be smoothly attenuated by a simple structure such as the plurality of wave-dissipating projections 177a to 177f protruding from the inner wall of the fluid passage 36 as the pulsation-attenuating mechanism 24. Therefore, it is possible to avoid increasing the size of the entire apparatus, thereby avoiding the increase in production cost.

What is claimed is:

1. A flow rate control apparatus comprising:

a pulsation-attenuating means for balancing a regulated pilot pressure from a pressure-regulating section and a primary pressure of a pressure fluid introduced into said flow rate control apparatus and flowing through a fluid passage to attenuate pressure fluctuation caused by pulsation of said pressure fluid; and a flow rate control mechanism having a valve plug for opening/closing said fluid passage, said flow rate control mechanism controlling a flow amount of said pressure fluid flowing through said fluid passage by adjusting a valve lift amount of said valve plug with a linear actuator controlled based on a control signal from a control unit.

wherein said pulsation-attenuating means includes a pressure-regulating section for regulating a pressure fluid introduced from a pressure fluid supply port to have a predetermined pressure, and a pulsation-balancing section provided with a valve member for opening/closing said fluid passage based on said pressure fluid from said pressure-regulating section, and wherein said valve member includes a sliding plate arranged displaceably between a first diaphragm and a second diaphragm, a valve plug connected to said sliding plate, a seal member attached to an outer surface of said sliding plate, and an intermediate member provided between said sliding plate and said valve plug.

2. The flow rate control apparatus according to claim 1, wherein said flow rate control mechanism is provided with a rotation-detecting section for detecting a displacement amount in an axial direction based on an amount of rotation of a drive shaft of said linear actuator.

3. The flow rate control apparatus according to claim 1, wherein said pulsation-attenuating means and said flow rate control mechanism are integrally assembled with a joint section, and said joint section is provided with said fluid passage for communicating with a first port disposed on one side of said joint section and a second port disposed on the other aide of said joint section.

4. The flow rate control apparatus according to claim 1, wherein said valve member is displaced by a pressing force of said pressure fluid flowing from said pressure-regulating section and introduced into a pressure chamber.

5. A flow rate control apparatus comprising:

a pulsation-attenuating mechanism for balancing a regulated pilot pressure from a pressure-regulating section and a primary pressure of a pressure fluid flowing through a fluid passage to attenuate pressure fluctuation caused by pulsation of said pressure fluid;

said pulsation-attenuating mechanism comprising a pulsation-balancing section provided with a valve member for opening/closing said fluid passage based on said pilot pressure, said valve member comprising a displaceable sliding plate in contact with a diaphragm, and a valve plug connected to said sliding plate, and a flow rate control mechanism having a valve plug for opening/closing said fluid passage, said flow rate control mechanism controlling a flow amount of said pressure fluid flowing through said fluid passage by adjusting a valve lift amount of said valve plug with a linear actuator controlled based on a control signal from a control unit, wherein said pressure-regulating section regulates a pressure fluid introduced from a pressure fluid supply port to thereby supply said pilot pressure having a predetermined pressure, and wherein said sliding plate is arranged displaceably between a first diaphragm and a second diaphragm a seal member is attached to an outer surface of said sliding plate, and an intermediate member is provided between said sliding plate and said valve plug.

6. The flow rate control apparatus according to claim 5, wherein said flow rate control mechanism is provided with a rotation-detecting section for detecting a displacement amount in an axial direction based on an amount of rotation of a drive shaft of said linear actuator.

7. The flow rate control apparatus according to claim 5, wherein said pulsation-attenuating mechanism and said flow rate control mechanism are integrally assembled with a joint section, and said joint section is provided with said fluid passage for communicating with a first port disposed on one side of said joint section and a second port disposed on the other side of said joint section.

8. The flow rate control apparatus according to claim 5, wherein said valve member is displaced by a pressing force of said pressure fluid flowing from said pressure-regulating section and introduced into a pressure chamber.

* * * * *